United States Patent [19]
Ozawa et al.

[11] Patent Number: 5,319,035

[45] Date of Patent: Jun. 7, 1994

[54] RUBBER COMPOSITION

[75] Inventors: Osamu Ozawa, Hiratsuka; Tetsu Kitami, Hadano, both of Japan

[73] Assignee: The Yokohama Rubber Co., Ltd., Tokyo, Japan

[21] Appl. No.: 697,591

[22] Filed: May 9, 1991

[30] Foreign Application Priority Data

May 10, 1990 [JP] Japan ................... 2-120708

[51] Int. Cl.$^5$ .............................................. C08F 8/34
[52] U.S. Cl. ..................................................... 525/333.9
[58] Field of Search ....................................... 525/333.9

[56] References Cited

U.S. PATENT DOCUMENTS

| | | | |
|---|---|---|---|
| 4,165,416 | 8/1979 | Matoba et al. | 524/576 |
| 4,288,576 | 9/1981 | Richwine | 525/349 |
| 4,342,851 | 8/1982 | Suzui et al. | 525/403 |
| 4,822,838 | 4/1989 | Watanabe et al. | 524/178 |

FOREIGN PATENT DOCUMENTS 61-26820  6/1986  Japan .

*Primary Examiner*—Michl, Paul R.
*Assistant Examiner*—Edward Cain
*Attorney, Agent, or Firm*—Finnegan, Henderson, Farabow, Garrett & Dunner

[57] ABSTRACT

Rubber compositions are disclosed which are formulated to provide high modulus at 100% and strong adhesion to metal. Chlorinated polyethylene rubber and/or its derivative reformed with maleic anhydride is blended with specified amounts of a 2-mercaptobenzothiazole dicyclohexylamine salt, trithiocyanuric acid and sufur such that formulae (1) and (2) are met $$\text{component } (C) \, (phr) \times \text{component } (D) \, (phr) \geq 0.5 \qquad (1)$$

$$\frac{\text{component } (E) \, (phr)}{\text{component } (C) \, (phr)} \geq 0.1 \qquad (2)$$

where phr is defined as the amount in parts of the component per hundred parts of component (A) or component (B) or both.

1 Claim, 1 Drawing Sheet

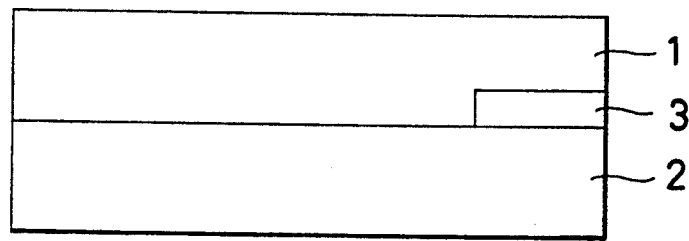

RUBBER COMPOSITION

BACKGROUND OF THE INVENTION

1Field of the Invention

This invention releates to rubber compositions containing chlorinated polyethylene type rubbers and providing increased tensile modulus and improved metal adhesion. Such compositions are suitable for use in rubber-metal composite structures.

2. Description of the Prior Art

There is a growing tendency to use a variety of rubber products such as tires, belts, shapes, rolls, hoses and the like under adversely oily conditions at high temperatures and pressures and for long periods of time. In that instance, the fastly deteriorating rubbers require laborious maintenance and frequent replacement and sometimes pose serious problems or hazards.

Certain rubbers are known to be highly resistant to oil and heat for example at from 120° to 150° C. They include acrylonitrile-butadiene rubber (NBR), acrylic rubber (ACM), ethylene-acrylate rubber (AEM), ethylene-acrylate-vinyl acetate rubber (ER), chlorosulfonated polyethylene rubber (CSM), chlorinated polyethylene rubber (CM) and reformed rubbers such as NBR and similar rubbers having their conjugated dienes hydrogenated. Chlorinated polyethylene rubber (CM) amongst these rubbers is commonly accepted as providing a good balance between and among oxidation resistance, weather resistance, oil resistance and chemical resistance.

Chlorinated polyethylene rubber is by nature unvulcanizable with sulfur due to the absence of double bonds in the molecule. Vulcanization is effected necessarily with use of organic peroxides, thioureas, diamines and trithiocyanuric acids.

Thioureas and diamines, however, will make the resulting vulcanizates susceptible to poor modulus. Organic peroxides and trithiocyanuric acids, though giving adequate modulus, will lead to insufficient bonding to metals such as brass and the like. This causes a problem with the use of chlorinated polyethylene rubber.

In an attempt to fully utilize the physical characteristics associated with chlorinated polyethylene rubber, it has been proposed to blend a vulcanizing system composed of magnesia, epoxy resin, trially isocyanurate, dially phthalate, trithiocyanuric acid and organic peroxide (Japanese Patent Publication No. 61-26820). This prior system of vulcanization, however, requires a mix of as many as six components and entails a limited choice of formulations, and has failed to further improve the ultimate rubber composition in regard to its physical properties.

SUMMARY OF THE INVENTION

With the foregoing drawbacks of the prior art in view, the present invention seeks to provide a new rubber composition which excels in modulus at 100%, adhesiveness to metal and selectivity in formulation.

The composition according to the invention finds application to tires, belts, shapes, rolls, hoses and various other rubber products. It may suitably be used particularly in interlaminar bonding those hoses of a heat-resistant, high-pressure type constructed with an inner tube, an outer cover and a pressure-resistant, steel-corded reinforcement layer interposed therebetween.

As will become better understood from the following description, the invention provides a rubber composition comprising 100 parts by weight of a chlorinated polyethylene rubber (A) or a maleic anhydride-reformed chlorinated polyethylene rubber (B) or a combination thereof, 0.5 to 5 parts by weight of a 2-mercaptobenzothiazole dicyclohexylamine salt (C), 0.2 to 10 parts by weight of a trithiocyanuric acid (D) and 0.05 to 5 parts by weight of a sulfur (E), coponents (C), (D) (E) being present according to the following formulae (1) and (2)

$$\text{component } (C) \text{ } (phr) \times \text{component } (D) \text{ } (phr) \geq 0.5 \quad (1)$$

$$\frac{\text{component } (E) \text{ } (phr)}{\text{component } (C) \text{ } (phr)} \geq 0.1 \quad (2)$$

where phr is defined as the amount in parts of the component per hundred parts of component (A) or component (B) or both.

BRIEF DESCRIPTION OF THE DRAWING

The accompanying drawing is a schematic crosssectional view of a rubber-brass laminate assembled with the rubber composition of the present invention, shown used for adhesion performance testing.

DETAILED DESCRIPTION OF THE INVENTION

The rubber composition, provided in accordance with the present invention, is comprised essentially of a chlorinated polyethylene rubber (A) or a maleic anhydride-reformed chlorinated polyethylene rubber (B) or both, a 2-mercaptobenzothiazole dicyclohexylamine salt (C), a trithiocyanuric acid (D) and a sulfur (E).

Component (A) used for purposes of the invention can be selected from all known grades of chlorinated polyethylene rubbers. The component is not specifically restricted in respect of its molecular weight, chlorine content, chlorine distribution or other physical properties.

Component (B) is a reformed chlorinated polyethylene rubber resulting from reacting a given grade of component (A) with maleic anhydride during kneading. Component (B) contributes, owing to the presence in the molecule of a dicarboxylic acid group or its anhydride group or both, to increased efficiency of vulcanization and hence a widened selectivity in formulation. The reformed type of rubber as component (B) is commercially available for instance as Elaslen Super from Showa Denko Co.

Components (A) and (B) may be used singly or in combination in the practice of the invnetion.

Components (C) and (D) constitute a system of vulcanization in the rubber composition of the invention. Compound (C) is a 2-mercaptobenzothiazole dicyclohexylamine salt of an organic sulfur compound family and of a molecular weight of about 303, while component (D) is trithiocyanuric acid.

Component (C) is commonly termed MDCA in shorthand form and is represented by the formula (3)

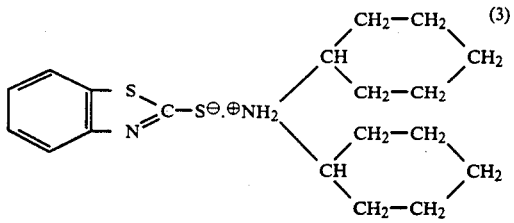

(3)

Component (D) is also called 2,4,6-trimercapto-1,3,5-triazine and is represented by the formula (4)

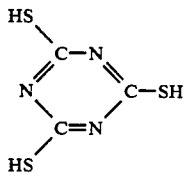

(4)

According to the invention component (D) functions as a vulcanizing agent and component (C) as a vulcanizing accelerator. Both components have a synergistic effect on vulcanization.

Component (E) is chosen from sulfurs of particulate, highly dispersible and insoluble types that are well known and are in common use. This component serves to increase bonding of the rubber to metals such as brass and the like. The use of sulfur donors in place of component (E) should be avoided to preclude a sharp decline in adhesion to brass in particular as will be illustrated later.

Component (C) or MDCA may range in amount from 0.5 to 5 parts by weight per 100 parts by weight of component (A) and/or component (B) or in other words, the base rubbers. Below 0.5 part would lead to poor vulcanization and hence insufficient modulus, whereas above 5 parts would render the resultant mix less bondable to metal and less resistant to heat.

Component (D) or trithiocyanuric acid may be added between 0.2 and 10 parts by weight based on 100 parts by weight of component (A) and/or component (B). Less that 0.2 part would be responsible for inadequate vulcanization and unacceptable modulus. More than 10 parts would produce no better results and sometimes reduce heat resistance and metal adhesion.

The amount of component (E) or sulfur to be used may be set at from 0.05 to 5 parts by weight per 100 parts by weight of component (A) and/or component (B). Component (E) if in smaller amounts than 0.05 part would not be effective for brass bonding and also for vulcanization and if in greater amounts than 5 parts would be feasible only in an uneconomical manner and prone in some cases to insufficient magnitudes of tensile modulus and heat resistance.

Importantly components (C), (D) and (E) should be blended with the hose rubber to according to the following formulae (1) and (2)

$$MDCA\ (phr) \times trithiocyanuric\ acid\ (phr) \geqq 0.5 \quad (1)$$

$$\frac{sulfur\ (phr)}{MDCA\ (phr)} \geqq 0.1 \quad (2)$$

where phr is defined as the amount present in parts per hundred parts of the rubber, namely either one or both of component (A) and component (B).

Formula (1) determine the minimum amounts of components (C) and (D) in which a vulcanizing agent or trithiocyanuric acid is allowed to effectively react with a vulcanizing accelerator or MDCA during vulcanization. Tensile modulus can only be achieved at a desired level if formula (1) is strictly observed.

Formula (2) determines the minimum amount of component (E) or how much sulfur is capable of facilitating the coreaction of MDCA with trithiocyanuric acid. Departures from formula (2) give rise to unacceptable adhesion to brass.

The rubber composition according to the invention may be further blended, where desired, with various other additives. They include acid acceptors such as magnesia and the like, fillers, reinforcing agents, plasticizers, antioxidants, processing aids and the like.

Vulcanization may be effected in a conventional manner at a temperature of 130° to 200° C. and by a mode of press curing, steam curing, hot water curing or the like.

The composition of the invention finds application to those rubber products calling for increased oil resistance at elevated temperature and pressure. For its superior bonding to brass, such composition is suitable particularly for use with brass structures. These structures are usually employed to reinforce rubber products and formed of filaments, tubings, plates, steel stocks which may be plated with brass.

The invention will now be described by way of the following examples which are provided for illustrative purposes only. All formulations are indicated by part by weight.

Performance evaluation was made under the conditions given below.

Tensile Modulus (100% Modulus)

Different rubber compositions were prepared as shown in Tables 1 to 7, followed by admixture on a mixing roll at 60° C. for 15 minutes and by subsequent sheeting to a thickness of 2.5 mm on a laboratory roll. The resulting rubber sheet was press-cured on a laboratory press at a temperature of 165° C. and at a face pressure of 30 kgf/cm² and for a length of time of 30 minutes.

Modulus at 100% was determined at a tensile speed of 500 mm/min.

All the procedures and calculations were as stipulated by JIS K6301.

Adhesion to Brass

The rubber sheet obtained above and designated at 1 in the accompanying drawing was contact-bonded over a brass plate 2 with a cellophane strip 3 interposed therebetween. The strip 3 was used to hold the sheet 1 in partly unbonded relation to the plate 2 and to provide a place to grip the sheet in peel testing.

The resultant laminate was press-cured into an integral structure by means of a laboratory press at 150° C. and at 30 kgf/cm² for 30 minutes. After being allowed to stand for 24 hours at room temperature, the vulcanizate was cut to a width of 2.54 cm to give a test specimen.

JIS K6301 was followed in measuring peel strength. The rubber sheet was caused to forcibly peel off at an angle of 90° with the plane of the brass plate and at a speed of 50 mm/min.

In these examples the abbreviation "IE" is taken to denote the inventive example and "CE" the comparative example.

INVENTIVE EXAMPLES 1 AND 2/COMPARATIVE EXAMPLES 1 TO 14

The rubber compositons of Table 1 were tested to examine the effects of sulfur blended.

The use of sulfur, IEs 1 and 2, has been found conspicuously strongly adhesive to brass. With respect to moludus at 100% IEs 1 and 2 were comparable to CEs 2 to 7 and 9 in which sulfur donors were present in place of sulfur and also to CEs 1 and 8 in which both sulfur and sulfur donors were absent.

INVENTIVE EXAMPLES 3 TO 7/COMPARATIVE EXAMPLES 15 TO 17

The effects of MDCA contents were checked with the rubber compositions of Table 2 with the results as tabulated.

MDCA contents of 0.5 to 5 parts by weight, IEs 3 to 7, is highly satisfactory in respect of both tensile modulus and brass bonding. Less than 0.5 part in CEs 15 and 16 was unacceptable in modulus, whereas more than 5 parts in CE 17 was insufficiently bondable to brass.

INVENTIVE EXAMPLES 6 AND 8 TO 11/COMPARATIVE EXAMPLES 18 TO 20

The effects of trithiocyanuric acid contents were checked with the rubber compositions of Table 3.

To provide a good balance between tensile modulus and brass bonding, the acid in question should range in content from 0.2 to 10 parts by weight as appears clear from IEs 6 and 8 to 10. Below 0.2 part in CEs 18 and 19 was unacceptably low in modulus at 100%. Above 10 parts in CE 20 revealed insufficient adhesion to brass.

INVENTIVE EXAMPLES 12 TO 16/COMPARATIVE EXAMPLES 21 TO 23

The effects of sulfur contents were checked with the rubber compositions of Table 4.

Sulfur contents in the range of 0.05 to 5 parts by weight, IEs 12 to 16, have been proved to be critical to acceptable magnitudes of tensile modulus and brass bonding. Less than 0.05 part in CEs 21 and 22 was not effective to improve brass bonding. More than 5 parts in CE 23 showed a decline in tensile modulus.

INVENTIVE EXAMPLES 17 TO 26/COMPARATIVE EXAMPLES 24 TO 26

With use of the rubber compositions formulated as shown in Tables 5 and 6, the relationship was examined between MDCA contents and trithiocyanuric acid contents. In Table 5 the MDCA contents were varied with trithiocyanuric acid and sulfur added in the amounts within the scope of the invention. Conversely, the contents of trithiocyanuric acid were varied in Table 6.

IEs 17 to 26 have been found to improve both tensile modulus and brass bonding. This is attributed to formula (1) of the invention having been met. Failure to comply with this formula, CEs 24 to 26, resulted in reduced modulus at 100% even with MDCA, trithiocyanuric acid and sulfur falling within the inventive amounts.

INVENTIVE EXAMPLES 27 TO 30 AND 9/COMPARATIVE EXAMPLES 27 TO 31

The relationship between MDCA contents and sulfur contents was adjudged with the rubber compositions of Table 7. Varied contents of sulfur were used except that MDCA and trithiocyanuric acid were blended in the inventive amounts.

IEs 27 to 30 and 9 are acceptable in both tensile modulus and brass bonding due to compliance with formula (2) according to the invention. Adhesion to brass is unlikely to improve for failure to meet this formula as is apparent from CEs 27 to 31.

Listed below are the notes and the details of the various components used in Tables 1 to 7.
1) Elaslen 301A, chlorinated polyethylene rubber, Showa Denko Co.
2) Elaslen Super G-107, maleic anhydride-reformed chlorinated polyethylene rubber, Showa Denko Co.
3) MDCA, Showa Denko Co.
4) Zisnet F, trithiocyanuric acid, Shankyo Chemicals Co.
5) Sunceller TT-PO, tetramethylthiuram disulfide, Sanshin Chemicals Co.
6) Sunceller TS-G, tetramethylthiuram monosufide, Sanshin Chemicals Co.
7) Sunceller M-SI-PO, 2-mercaptobenzothiazol, Sanshin Chemicals Co.
8) Sunceller DM-PO, dibenzothiazyl desulfide, Sanshin Chemicals Co.
9) Sunceller CM-PO, N-cyclohexyl-2-benzothiazyl sulfenamide
10) Sunceller 232-MG, N-oxydiethylene-2-benzothiazolyl sulfenamide, Sanshin Cemicals Co.
11) SRF Asahi No. 50, SRF carbon black, Asahi Carbons Co.
12) Adekacizer C9-N, trimellitate ester, Adeka Argus Chemicals Co.
13) Sulfur donor in case of absence of sulfur

TABLE 1

| Formulation/Property | | CE1 | IE1 | CE2 | CE3 | CE4 | CE5 | CE6 | CE7 |
|---|---|---|---|---|---|---|---|---|---|
| Elaslen 301A | 1) | 100 | 100 | 100 | 100 | 100 | 100 | 100 | 100 |
| Elaslen Super G-107 | 2) | | | | | | | | |
| MDCA | 3) | 1.5 | 1.5 | 1.5 | 1.5 | 1.5 | 1.5 | 1.5 | 1.5 |
| Zisnet F | 4) | 1.5 | 1.5 | 1.5 | 1.5 | 1.5 | 1.5 | 1.5 | 1.5 |
| sulfur | | | 0.3 | | | | | | |
| Sunceller TT-PO | 5) | | | 0.3 | | | | | |
| Sunceller TS-G | 6) | | | | 0.3 | | | | |
| Sunceller M-SI-PO | 7) | | | | | 0.3 | | | |
| Sunceller PM-PO | 8) | | | | | | 0.3 | | |
| Sunceller CM-PO | 9) | | | | | | | 0.3 | |
| Sunceller 232-MG | 10) | | | | | | | | 0.3 |
| SRF | 11) | 100 | 100 | 100 | 100 | 100 | 100 | 100 | 100 |
| MgO | | 10 | 10 | 10 | 10 | 10 | 10 | 10 | 10 |
| stearic acid | | 1 | 1 | 1 | 1 | 1 | 1 | 1 | 1 |
| Adekacizer C9-N | 12) | 25 | 25 | 25 | 25 | 25 | 25 | 25 | 25 |
| formula (1), left | | 2.25 | 2.25 | 2.25 | 2.25 | 2.25 | 2.25 | 2.25 | 2.25 |

TABLE 1-continued

| | | | | | | | | | |
|---|---|---|---|---|---|---|---|---|---|
| formula (2), left | 13) | 0 | 0.20 | 0.20 | 0.20 | 0.20 | 0.20 | 0.20 | 0.20 |
| elastic modulus, kgf/cm$^2$ | | 124 | 123 | 121 | 111 | 124 | 120 | 121 | 126 |
| peel strength, kgf/25 mm | | 3.0 | 18.0 | 5.2 | 4.0 | 3.0 | 2.3 | 2.2 | 2.0 |

| Formulation/Property | | CE8 | IE2 | CE9 | CE10 | CE11 | CE12 | CE13 | CE14 |
|---|---|---|---|---|---|---|---|---|---|
| Elaslen 301A | 1) | | | | | | | | |
| Elaslen Super G-107 | 2) | 100 | 100 | 100 | 100 | 100 | 100 | 100 | 100 |
| MDCA | 3) | 1.5 | 1.5 | 1.5 | 1.5 | 1.5 | 1.5 | 1.5 | 1.5 |
| Zisnet F | 4) | 1.5 | 1.5 | 1.5 | 1.5 | 1.5 | 1.5 | 1.5 | 1.5 |
| sulfur | | | 0.3 | | | | | | |
| Sunceller TT-PO | 5) | | | 0.3 | | | | | |
| Sunceller TS-G | 6) | | | | 0.3 | | | | |
| Sunceller M-SI-PO | 7) | | | | | 0.3 | | | |
| Sunceller PM-PO | 8) | | | | | | 0.3 | | |
| Sunceller CM-PO | 9) | | | | | | | 0.3 | |
| Sunceller 232-MG | 10) | | | | | | | | 0.3 |
| SRF | 11) | 100 | 100 | 100 | 100 | 100 | 100 | 100 | 100 |
| MgO | | 10 | 10 | 10 | 10 | 10 | 10 | 10 | 10 |
| stearic acid | | 1 | 1 | 1 | 1 | 1 | 1 | 1 | 1 |
| Adekacizer C9-N | 12) | 25 | 25 | 25 | 25 | 25 | 25 | 25 | 25 |
| formula (1), left | | 2.25 | 2.25 | 2.25 | 2.25 | 2.25 | 2.25 | 2.25 | 2.25 |
| formula (2), left | 13) | 0 | 0.20 | 0.20 | 0.20 | 0.20 | 0.20 | 0.20 | 0.20 |
| elastic modulus, kgf/cm$^2$ | | 112 | 111 | 123 | 116 | 110 | 110 | 109 | 115 |
| peel strength, kgf/25 mm | | 2.0 | 15.0 | 4.5 | 4.5 | 2.5 | 2.5 | 2.0 | 2.0 |

TABLE 2

| Formulation/Property | | CE15 | CE16 | IE3 | IE4 | IE5 | IE6 | IE7 | CE17 |
|---|---|---|---|---|---|---|---|---|---|
| Elaslen Super G-107 | 2) | 100 | 100 | 100 | 100 | 100 | 100 | 100 | 100 |
| MDCA | 3) | 0 | 0.2 | 0.5 | 1.0 | 1.5 | 2.5 | 5.0 | 10.0 |
| Zisnet | 4) | 1.5 | 1.5 | 1.5 | 1.5 | 1.5 | 1.5 | 1.5 | 1.5 |
| sulfur | | 0.5 | 0.5 | 0.5 | 0.5 | 0.5 | 0.5 | 0.5 | 0.5 |
| SRF | 11) | 100 | 100 | 100 | 100 | 100 | 100 | 100 | 100 |
| MgO | | 10 | 10 | 10 | 10 | 10 | 10 | 10 | 10 |
| stearic acid | | 1 | 1 | 1 | 1 | 1 | 1 | 1 | 1 |
| Adekacizer C9-N | 12) | 25 | 25 | 25 | 25 | 25 | 25 | 25 | 25 |
| formula (1), left | | 0 | 0.3 | 0.75 | 1.50 | 2.25 | 3.75 | 7.50 | 11.5 |
| formula (2), left | 13) | — | 2.50 | 1.00 | 0.50 | 0.33 | 0.20 | 0.10 | 0.05 |
| elastic modulus, kgf/cm$^2$ | | 20 | 37 | 61 | 92 | 106 | 113 | 115 | 116 |
| peel strength, kgf/25 mm | | 15.5 | 15.3 | 15.0 | 14.0 | 13.0 | 10.0 | 7.8 | 2.8 |

TABLE 3

| Formulation/Property | | CE18 | CE19 | IE8 | IE6 | IE9 | IE10 | IE11 | CE20 |
|---|---|---|---|---|---|---|---|---|---|
| Elaslen Super G-107 | 2) | 100 | 100 | 100 | 100 | 100 | 100 | 100 | 100 |
| MDCA | 3) | 2.5 | 2.5 | 2.5 | 2.5 | 2.5 | 2.5 | 2.5 | 2.5 |
| Zisnet | 4) | 0 | 0.1 | 0.2 | 1.5 | 2.5 | 5.0 | 10.0 | 15.0 |
| sulfur | | 0.5 | 0.5 | 0.5 | 0.5 | 0.5 | 0.5 | 0.5 | 0.5 |
| SRF | 11) | 100 | 100 | 100 | 100 | 100 | 100 | 100 | 100 |
| MgO | | 10 | 10 | 10 | 10 | 10 | 10 | 10 | 10 |
| stearic acid | | 1 | 1 | 1 | 1 | 1 | 1 | 1 | 1 |
| Adekacizer C9-N | 12) | 25 | 25 | 25 | 25 | 25 | 25 | 25 | 25 |
| formula (1), left | | 0 | 0.25 | 0.50 | 3.75 | 6.25 | 12.50 | 25.00 | 37.5 |
| formula (2), left | 13) | 0.20 | 0.20 | 0.20 | 0.20 | 0.20 | 0.20 | 0.20 | 0.20 |
| elastic modulus, kgf/cm$^2$ | | 40 | 49 | 78 | 113 | 126 | 144 | 154 | 158 |
| peel strength, kgf/25 mm | | 15.5 | 15.0 | 14.6 | 10.0 | 9.0 | 8.1 | 7.4 | 6.7 |

TABLE 4

| Formulation/Property | | CE21 | CE22 | IE12 | IE13 | IE14 | IE15 | IE16 | CE23 |
|---|---|---|---|---|---|---|---|---|---|
| Elaslen Super G-107 | 2) | 100 | 100 | 100 | 100 | 100 | 100 | 100 | 100 |
| MDCA | 3) | 0.5 | 0.5 | 0.5 | 0.5 | 0.5 | 0.5 | 0.5 | 0.5 |
| Zisnet | 4) | 2.5 | 2.5 | 2.5 | 2.5 | 2.5 | 2.5 | 2.5 | 2.5 |
| sulfur | | 0 | 0.02 | 0.05 | 0.3 | 0.5 | 1.0 | 5.0 | 8.0 |
| SRF | 11) | 100 | 100 | 100 | 100 | 100 | 100 | 100 | 100 |
| MgO | | 10 | 10 | 10 | 10 | 10 | 10 | 10 | 10 |
| stearic acid | | 1 | 1 | 1 | 1 | 1 | 1 | 1 | 1 |
| Adekacizer C9-N | 12) | 25 | 25 | 25 | 25 | 25 | 25 | 25 | 25 |
| formula (1), left | | 1.25 | 1.25 | 1.25 | 1.25 | 1.25 | 1.25 | 1.25 | 11.25 |
| formula (2), left | 13) | 0 | 0.04 | 0.10 | 0.60 | 1.00 | 2.00 | 10.00 | 16.00 |
| elastic modulus, kgf/cm$^2$ | | 108 | 104 | 100 | 88 | 83 | 82 | 77 | 75 |
| peel strength, kgf/25 mm | | 3.0 | 5.7 | 7.8 | 12.5 | 14.7 | 17.2 | 19.6 | 20.8 |

TABLE 5

| Formulation/Property | | CE24 | IE17 | IE18 | IE19 | IE20 | IE21 | IE22 | IE23 |
|---|---|---|---|---|---|---|---|---|---|
| Elaslen Super G-107 | 2) | 100 | 100 | 100 | 100 | 100 | 100 | 100 | 100 |
| MDCA | 3) | 0.5 | 1.0 | 1.5 | 2.0 | 0.5 | 1.0 | 1.5 | 2.0 |
| Zisnet | 4) | 0.5 | 0.5 | 0.5 | 0.5 | 1.0 | 1.0 | 1.0 | 1.0 |
| sulfur | | 0.3 | 0.3 | 0.3 | 0.3 | 0.3 | 0.3 | 0.3 | 0.3 |
| SRF | 11) | 100 | 100 | 100 | 100 | 100 | 100 | 100 | 100 |
| MgO | | 10 | 10 | 10 | 10 | 10 | 10 | 10 | 10 |
| stearic acid | | 1 | 1 | 1 | 1 | 1 | 1 | 1 | 1 |
| Adekacizer C9-N | 12) | 25 | 25 | 25 | 25 | 25 | 25 | 25 | 25 |
| formula (1), left | | 0.25 | 0.50 | 0.75 | 1.00 | 0.50 | 1.00 | 1.50 | 2.00 |
| formula (2), left | 13) | 0.60 | 0.30 | 0.20 | 0.15 | 0.60 | 0.30 | 0.20 | 0.15 |
| elastic modulus, kgf/cm$^2$ | | 42 | 68 | 80 | 85 | 65 | 90 | 102 | 108 |
| peel strength, kgf/25 mm | | 18.0 | 17.0 | 15.5 | 14.0 | 15.5 | 14.5 | 13.5 | 13.0 |

TABLE 6

| Formulation/Property | | CE25 | CE24 | IE20 | IE24 | CE26 | IE25 | IE21 | IE26 |
|---|---|---|---|---|---|---|---|---|---|
| Elaslen Super G-107 | 2) | 100 | 100 | 100 | 100 | 100 | 100 | 100 | 100 |
| MDCA | 3) | 0.5 | 0.5 | 0.5 | 0.5 | 1.0 | 1.0 | 1.0 | 1.0 |
| Zisnet | 4) | 0.2 | 0.5 | 1.0 | 2.0 | 0.2 | 0.5 | 1.0 | 2.0 |
| sulfur | | 0.3 | 0.3 | 0.3 | 0.3 | 0.3 | 0.3 | 0.3 | 0.3 |
| SRF | 11) | 100 | 100 | 100 | 100 | 100 | 100 | 100 | 100 |
| MgO | | 10 | 10 | 10 | 10 | 10 | 10 | 10 | 10 |
| stearic acid | | 1 | 1 | 1 | 1 | 1 | 1 | 1 | 1 |
| Adekacizer C9-N | 12) | 25 | 25 | 25 | 25 | 25 | 25 | 25 | 25 |
| formula (1), left | | 0.10 | 0.25 | 0.50 | 1.00 | 0.20 | 0.50 | 1.00 | 2.00 |
| formula (2), left | 13) | 0.60 | 0.60 | 0.60 | 0.60 | 0.30 | 0.30 | 0.30 | 0.30 |
| elastic modulus, kgf/cm$^2$ | | 26 | 42 | 65 | 80 | 44 | 68 | 90 | 107 |
| peel strength, kgf/25 mm | | 19.4 | 18.0 | 15.5 | 13.0 | 18.4 | 17.0 | 14.5 | 12.5 |

TABLE 7

| Formulation/Property | | CE27 | CE28 | IE27 | IE28 | IE29 | CE29 | CE30 | CE31 | IE30 | IE9 |
|---|---|---|---|---|---|---|---|---|---|---|---|
| Elaslen Super G-107 | 2) | 100 | 100 | 100 | 100 | 100 | 100 | 100 | 100 | 100 | 100 |
| MDCA | 3) | 1.5 | 1.5 | 1.5 | 1.5 | 1.5 | 2.5 | 2.5 | 2.5 | 2.5 | 2.5 |
| Zisnet | 4) | 2.5 | 2.5 | 2.5 | 2.5 | 2.5 | 2.5 | 2.5 | 2.5 | 2.5 | 2.5 |
| sulfur | | 0.05 | 0.1 | 0.15 | 0.25 | 0.5 | 0.05 | 0.1 | 0.15 | 0.25 | 0.5 |
| SRF | 11) | 100 | 100 | 100 | 100 | 100 | 100 | 100 | 100 | 100 | 100 |
| MgO | | 10 | 10 | 10 | 10 | 10 | 10 | 10 | 10 | 10 | 10 |
| stearic acid | | 1 | 1 | 1 | 1 | 1 | 1 | 1 | 1 | 1 | 1 |
| Adekacizer C9-N | 12) | 25 | 25 | 25 | 25 | 25 | 25 | 25 | 25 | 25 | 25 |
| formula (1), left | | 3.75 | 3.75 | 3.75 | 3.75 | 3.75 | 6.25 | 6.25 | 6.25 | 6.25 | 6.25 |
| formula (2), left | 13) | 0.03 | 0.07 | 0.10 | 0.17 | 0.33 | 0.02 | 0.04 | 0.06 | 0.10 | 0.20 |
| elastic modulus, kgf/cm$^2$ | | 138 | 132 | 128 | 125 | 122 | 146 | 139 | 135 | 130 | 126 |
| peel strength, kgf/25 mm | | 5.3 | 6.2 | 9.5 | 10.7 | 13.3 | 1.6 | 2.6 | 4.5 | 7.8 | 9.0 |

What is claimed is:

1. A rubber composition comprising:
   (a) 100 parts by weight of a rubber selected from the group consisting of a chlorinated polyethylene rubber, a maleic anhydride reformed chlorinated polyethylene rubber or mixtures thereof;
   (b) from 0.5 to 5.0 parts by weight of 2-mercaptobenzothiazole dicyclohexylamine salt;
   (c) from 0.2 to 10 parts by weight of trithiocyanuric acid; and
   (d) from 0.05 to 5.0 parts by weight of particulate sulfur;
   said components (b), (c) and (d) being present in said composition in parts per 100 parts of (a) according to the following formulae:

$(b) \times (c) \geq 0.5$ $(d) \div (b) \geq 0.1$

* * * * *